United States Patent [19] [11] Patent Number: 4,621,614
Sykes Jr. [45] Date of Patent: Nov. 11, 1986

[54] HEAT STORAGE MEANS

[76] Inventor: Marvin E. Sykes, Jr., Rte. 1, Box 67, Wake Forest, N.C. 27587

[21] Appl. No.: 724,290

[22] Filed: Apr. 17, 1985

Related U.S. Application Data

[63] Continuation of Ser. No. 478,068, Mar. 23, 1983, abandoned.

[51] Int. Cl.⁴ .............................. F24J 2/00
[52] U.S. Cl. ................... 126/417; 126/400; 126/430; 165/54; 165/48.2
[58] Field of Search ............ 126/400, 417, 436, 901, 126/430, 428, 427; 165/485, 54, DIG. 4, 10 A; 52/517, 518, 233; 428/541; 217/128, 129, 131

[56] References Cited

U.S. PATENT DOCUMENTS

| 4,006,856 | 2/1977 | Nilsson | 126/430 X |
| 4,122,828 | 10/1978 | DiPeri | 126/400 X |
| 4,269,170 | 5/1981 | Guerra | 126/428 |
| 4,295,415 | 10/1981 | Schneider, Jr. | 126/428 X |
| 4,372,373 | 2/1983 | Haugneder et al. | 126/431 X |

FOREIGN PATENT DOCUMENTS 2472726 7/1981 France ........................ 126/436

OTHER PUBLICATIONS

"The Passive & Hybrid Solar Energy Program", DOE/CS 4970-1, Nov. 1980, Chapter III, pp. 3.1–3.6.

Primary Examiner—Randall L. Green
Attorney, Agent, or Firm—Mills & Coats

[57] ABSTRACT

This invention is a heat storage system utilizing pressure treated, high density fibrous products to capture and hold heat, particularly in passive solar applications. This heat storage means is preferably in the form of pressure treated logs or timbers which, once heated, will slowly release this heat over an extended period of time.

1 Claim, 5 Drawing Figures

HEAT STORAGE MEANS

This is a continuation of U.S. patent Ser. No. 478,068, Filed Mar. 23, 1983, now abandoned, entitled IMPROVED HEAT STORAGE MEANS.

FIELD OF INVENTION

This invention relates to heat storage means and more particularly to heat storage means used in conjunction with solar applications.

BACKGROUND OF INVENTION

Since man first began a conscientious effort to heat the enclosures in which he works and lives, the storage of excess heat for use at a later time has been a problem. This not only applies to the storage of excess heat for disbursement between stokings of furnaces, stoves or the like to prevent roller coaster heat increments and decreases, but also on a much larger scale the storage of solar energy not only during night periods but also during extended cloudy days.

Although the collection of solar energy for heating purposes has been experimented with and known for a long period of time, it was only after the severe fossil fuel shortages of the mid-1970's that wide spread attention has been focused on the storage of excessive heat for later use over an extended period of time.

Although the problems of heat storage from combustion sources could be applied to the present invention, the greater storage volume involved in solar applications dicates that this area be more fully discussed. This is not intended however to in any way limit the application of the present invention to other heat storage applications.

In retrofit applications for existing structures, active solar applications generally are the most feasible. In these systems collector panels are mounted for maximum exposure to the sun and high temperature concentrated storage areas such as insulated hot water tanks, salts, drum storage areas, or the like are used therewith. These systems include forced heat transfer through liquid or gaseous mediums from the collecting means to the storage means and later from the storage means to the use application.

The various active solar systems, while being far superior to combustion heat sources as far as cost and availability goes, do require outside energy sources to move the heat transfer mediums and to otherwise effecuate control of the system.

For new construction, passive solar or quasi-passive solar systems have been developed in an effort to allow structures to be heated without active or forced heat transfer to and from the storage area or areas. The solar envelope or quasi-solar envelope wherein an outer shell is designed to retain heat in a sun space between such outer shell and an inner shell containing living or working space. These solar envelope structures generally include means for allowing the entrance of maximum sunlight during winter months for solar collection and minimum sun during the summer or warmer months of the year. This is done either through shade or louver means or by taking advantage of the variation of sun angles during different seasons.

In each passive solar application, the idea is to store a maximum amount of heat during sunlight hours which can be released during cloudy or night periods. Heat storage means for release during the non or low sunlight periods have taken various forms from water or liquid filled jugs and drums, to brick or stone lined areas, to small swimming pools, to sophisticated storage areas containing various types of minerals.

Each of the above heat storage systems has its own unique problems in either not adequately retaining the heat stored therein, requiring more volume than available space, or being cost prohibitive or a combination thereof.

BRIEF DESCRIPTION OF INVENTION

After much research and study into the above-mentioned problems, the present invention has been developed to provide a highly efficient, long term storage means for collected heat while eliminating the necessity for special storage areas and/or storage materials.

The above is accomplished through the use of wooden timbers or logs preferably pressure treated to increase the density thereof through deep penetration of preservative salts. Although certainly not limited to any specific application, the present invention has been found to be particularly suited for use in conjunction with envelope construction wherein at least the interior envelope is of the treated log type where the entire structure and not just the direct ray contact areas will be heated and act as the heat sink for later slow release.

In view of the above it is an object of the present invention to provide an improved heat storage means constructed from highly density cellulose material.

Another object of the present invention is to provide a heat storage means formed from relatively large timbers or logs.

Another object of the present invention is to provide a heat storage means composed of pressure treated wood.

Another object of the present invention is to provide a heat storage means wherein at least a portion of the structure acts as the heat sink itself.

Another object of the present invention is to provide, in an envelope type passive solar application, at least the inner envelope be constructed from salt treated timbers to act as a heat storage means.

Another object of the present invention is to use pressure treated wood as a heat storage means.

Other objects and advantages of the present invention will become apparent and obvious from a study of the following description and the accompanying drawings which are merely illustrative of the present invention.

DETAILED DESCRIPTION OF INVENTION

Figure 1:
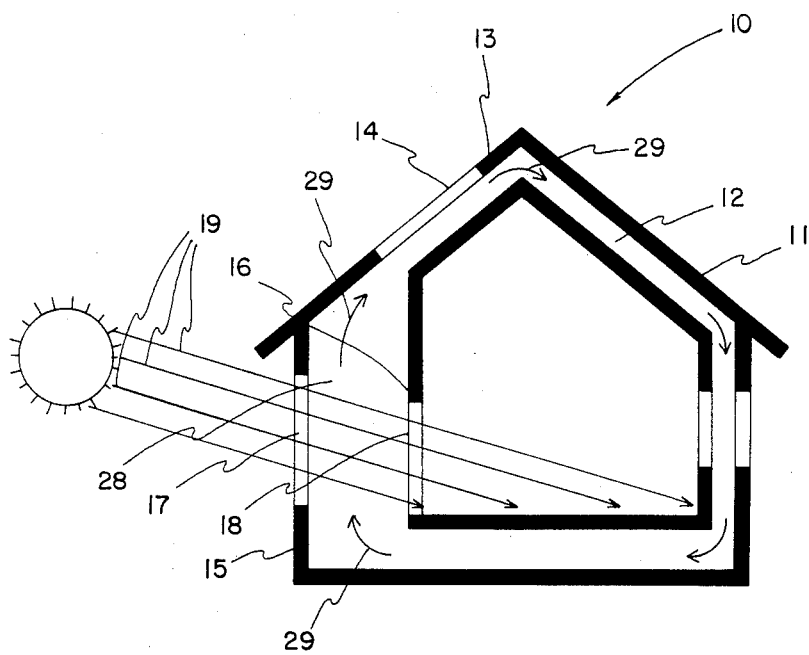
FIG. 1 is a sectional view in somewhat schematic form of a solar envelope structure during a typical winter or low sun angle day.

With further reference to the drawings, a solar envelope structure is indicated at 10 and includes an outer shell 11 and an inner shell 12.

A roof 13 includes a roof glass 14 to aid the solar drive during summer cooling.

A sun or solar wall 15 is provided in outer shell 11 and a second solar wall 16 is provided in inner shell 12. A transparent section 17 in solar wall 15, commonly referred to as a wall glass, is in alignment with a wall glass 18 in solar wall 16 of inner shell 12. The spacing and alignment of wall glasses 17 and 18 are such that when the sun is at its lower elevations during the cooler months of the year, its rays will enter the structure as indicated at 19 in FIG. 1. During the warmer months of the year when the sun is at a high angle of inclination, its rays are at too great an angle to enter the structure through the wall glasses but will enter the roof glass 14 as indicated at 20 in FIG. 3.

A summer cool air intake 21 is located on the opposite side of the structure from solar wall 15.

Figure 3:
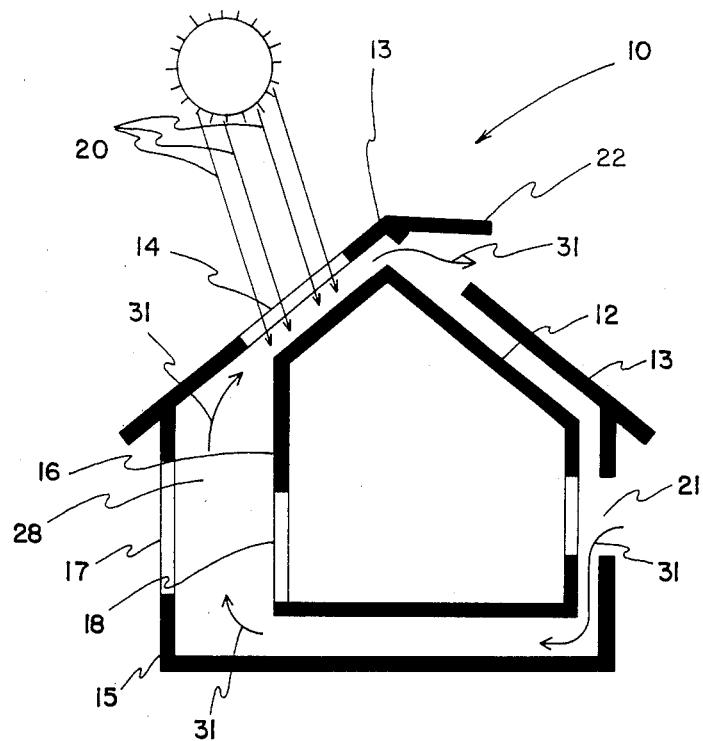
FIG. 3 is a sectional view similar to FIG. 1 during a typical summer or high sun angle day.
Figure 5:
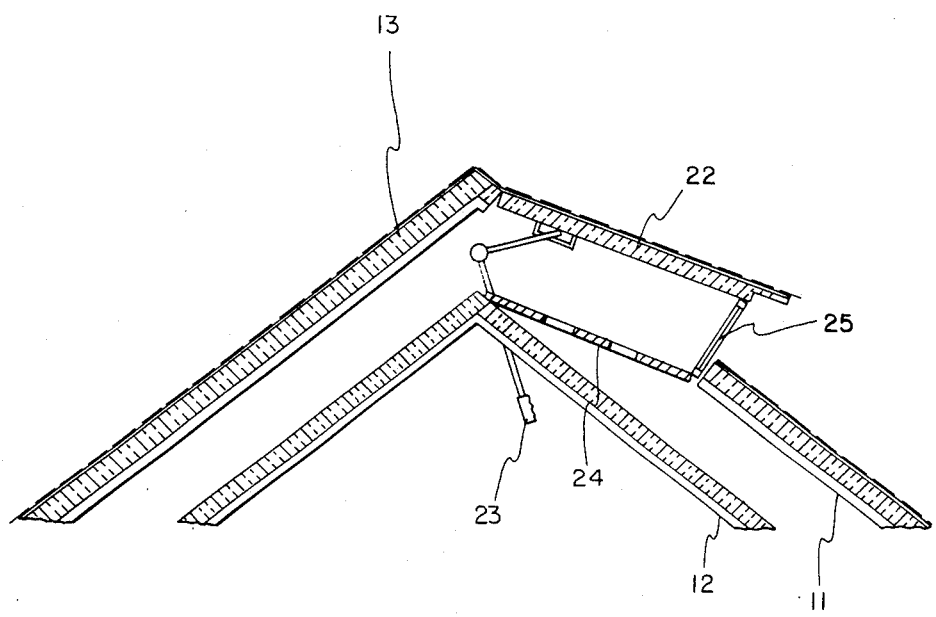
FIG. 5 is an enlarged sectional view of a typical roof ventilator used in conjunction with the envelope structure form of the present invention.

Roof ventilator 22 is open as indicated in FIG. 3 during warm weather operation. Details of this ventilation system are shown in FIG. 5 where the vent 22 includes an actuating handle 23, a ventilating baffle 24 and a screen 25. Since ventilating systems of this general type are known to those skilled in the art, further detailed description of the same is not deemed necessary.

Figure 2:
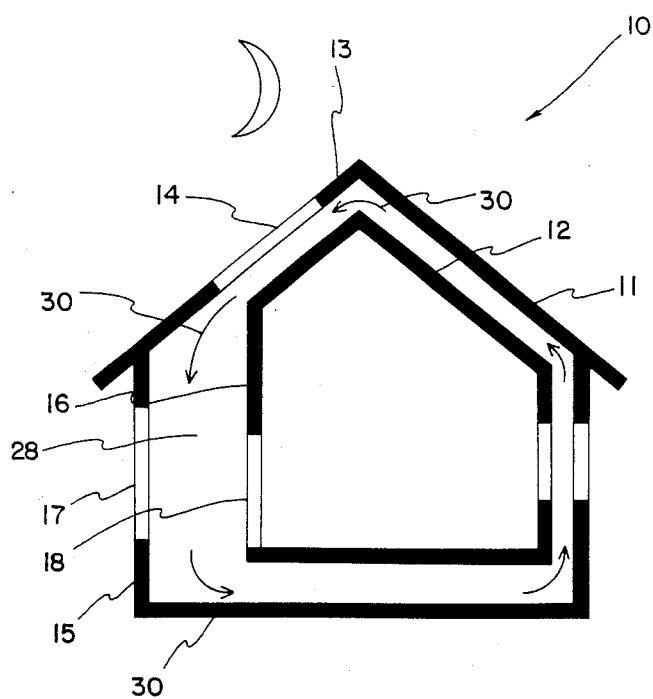
FIG. 2 is a sectional view similar to FIG. 1 during a typical winter night.

To collect and hold the heat entering the structure as shown in FIG. 1 for release during dark or cloudy periods as shown in FIG. 2, various means have been used including tiled floors, jugs and drums filled with water or other liquids, and various other means. Heat storage means in passive solar structures, although assorted, have not proved adequate for the purpose. One of the main reasons for this is that to have enough sun contacted mass for adequate storage, the usable interior space has to be severely limited, or if not limited, then there is not enough storage capacity.

After much research, experimentation, and study into various passive solar systems including envelope structures, the present invention has been developed to provide more than adequate heat storage capacity while not restricting the usable interior space of a structure. This is accomplished through construction of the walls of the inner and outer shells 11 and 12 from heavy, salt impregnated timbers. This gives the thermal mass necessary to store solar heat not only during night time periods but also during the following cloudy days as hereinafter set forth in greater detail.

Figure 4:
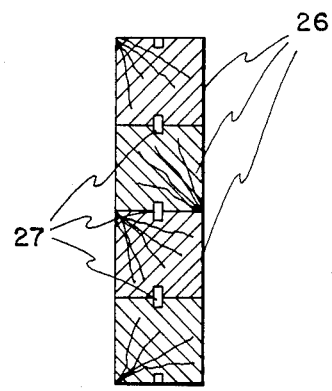
FIG. 4 is a typical sectional view of the heat storage means of the present invention.

Timber construction of the above-type is indicated in FIG. 4 wherein the timbers 26 are interconnected by spines 27. Each of the wall timbers are preferably salt impregnated six inch by six inch Southern Yellow Pine although other types of woods can obviously be used. The treating process is preferably of the vaccum-pressure type which forces the preservatives deep into the cellular structure of the wood.

A typical example of a vaccum-pressure salt treatment process is the preservation process known by the brand name Osmose K-33 by Osmose Wood Preserving Company of America, Inc., having some offices at Buffalo, N.Y. Since salt impregnated timber of this type is readily available commercially, further detailed discussion of this portion of the present invention is deemed necessary.

When an envelope structure is constructed in accordance with the present invention rather than conventional light framing which has a little mass and low heat retaining ability, as the sun's rays 19 pass through the outer and inner wall glasses 17 and 18, the heat from such rays is absorbed into the timbers 26 which they come in contact with. As the air in the sun space 28 of the structure 10 is heated, it rises therefrom as indicated by the air flow arrows 29 in FIG. 1. This heated air as it passes along the wall timbers which are not in direct contact with the sun's rays absorb heat thereby allowing the entire timbered walls to act as a heat sink rather than just the directly contacted areas.

At night during the cooler periods of the year, as the sun space 28 cools slightly faster than the remaining areas, a reverse air flow as indicated at 30 in FIG. 2 is created picking up previously stored heat from the timbered walls to maintain an even temperature within the inner shell 12.

During the warmer periods of the year the cool ambient air intake 21 is opened and the heated air in the upper portion of the envelope causes a thermal chimney effect so that hot air is expelled through roof ventilator 32. The air entering intake 21 passes under inner shell 12 where ground temperatures are cool. This cooled air then absorbs heat from the timbered walls which is expelled thus providing natural cooling passively with no exterior power requirements.

From the above it can be seen that the present invention provides a heat storage means of large capacity which passively stores an releases heat through natural convection currents. No additional heat storage means are necessary and thus the entire interior can be used for living space rather than additional heat storage.

The present invention may, of course, be carried out in other specific ways that those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A passive solar building structure comprising: an outer house like structure constructed partly from light transmissive material and substantially the remainder from salt-impregnated wood; an inner house like structure disposed interiorly of said outer structure constructed partly from light transmissive material and substantially the remainder from salt-impregnated wood, at least one light transmissive portion of said outer structure being opposite a salt-impregnated wood portion of said inner structure and located near an upper portion of said house like structures respectively, said outer structure and said inner structure defining a closed loop air circulation channel therebetween which encircles said inner structure whereby solar light will pass through said at least one light transmissive material to heat said opposite salt-impregnated wood which in turn creates natural convection air circulation within said closed loop channel to allow portions of said salt-impregnated wood which are not in direct contact with said solar light to absorb and store the air circulated heat.

* * * * *